(12) United States Patent
Jung et al.

(10) Patent No.: US 9,053,868 B2
(45) Date of Patent: Jun. 9, 2015

(54) METHOD OF MANUFACTURING A GRAPHENE-CONTAINING ELECTROLYTE

(75) Inventors: Mi Hee Jung, Daejeon (KR); Mangu Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 13/585,498

(22) Filed: Aug. 14, 2012

(65) Prior Publication Data

US 2013/0042917 A1     Feb. 21, 2013

(30) Foreign Application Priority Data

Aug. 19, 2011     (KR) .................. 10-2011-0082643

(51) Int. Cl.
| | | |
|---|---|---|
| C01B 31/04 | (2006.01) | |
| B82Y 30/00 | (2011.01) | |
| H01G 9/22 | (2013.01) | |
| H01G 9/20 | (2006.01) | |

(52) U.S. Cl.
CPC .............. *H01G 9/2013* (2013.01); *B82Y 30/00* (2013.01); *Y02E 10/542* (2013.01); *H01G 9/2031* (2013.01); *H01G 9/2059* (2013.01)

(58) Field of Classification Search
CPC .......... B82Y 30/00; C08K 3/04; C01B 31/00; C01B 31/04; C01B 31/0423; C01B 31/043; C01B 31/0438; C01B 31/0466; C01B 31/0469; C01B 31/0476; Y02E 60/122; Y02E 60/13; Y02E 60/549; Y02E 60/542; H01G 9/2059; H01G 9/22; H01L 31/022425
USPC .......... 136/243–265; 977/734, 842, 948, 899; 423/448, 415.1
See application file for complete search history.

(56) References Cited

U.S. PATENT DOCUMENTS

| | | | | |
|---|---|---|---|---|
| 2009/0139569 | A1* | 6/2009 | Tsuchiya et al. | 136/256 |
| 2011/0171119 | A1* | 7/2011 | Yazami | 423/657 |
| 2012/0138118 | A1* | 6/2012 | Obonai et al. | 136/244 |

FOREIGN PATENT DOCUMENTS

CN      101985354 A  *  3/2011

OTHER PUBLICATIONS

Chuan-Pei Lee et al., "Iodine-free high efficient quasi solid-state dye-sensitized solar cell containing ionic liquid and polyaniline-loaded carbon black", Journal of Materials Chemistry, pp. 2356-2361, Feb. 2, 2010, vol. 20.

(Continued)

*Primary Examiner* — Jayne Mershon
*Assistant Examiner* — Mayla Gonzalez Ramos
(74) *Attorney, Agent, or Firm* — Rabin & Berdo, P.C.

(57) ABSTRACT

A method of manufacturing a graphene-containing electrolyte includes, in the order recited: (a) deoxidizing graphene oxide to form graphene; (b) dissolving the graphene in a carbonate solvent to provide a graphene-containing solution; and (c) adding an oxidation-reduction agent composed of 1-butyl-2,3-dimethylimidazolium iodide (BDI) and optionally iodine ($I_2$) into the graphene-containing solution to provide the graphene-containing electrolyte. Deoxidizing the graphene oxide may be accomplished by dissolving the graphene oxide in an aqueous solvent that is a mixture of water and an alkyl imidazole-based iodine to form a solution; and centrifuging the solution to obtain the graphene. A dye-sensitized solar cell may include the graphene-containing electrolyte to fill a space defined between first and second electrodes.

10 Claims, 6 Drawing Sheets

(56) References Cited

OTHER PUBLICATIONS

Nobuyuki Ikeda et al., "Conductive polymer-carbon-imidazolium composite: a simple means for constructing solid-state dye-sensitized solar cells", Chemical Communications, Mar. 10, 2006, pp. 1733-1735.

William S. Hummers et al., "Preparation of Graphitic Oxide", J. Am. Chem. Soc., Mar. 20, 1958, pp. 1339, vol. 80, No. 6.

* cited by examiner

METHOD OF MANUFACTURING A GRAPHENE-CONTAINING ELECTROLYTE

CROSS-REFERENCE TO RELATED APPLICATIONS

This U.S. non-provisional patent application claims priority under 35 U.S.C. §119 to Korean Patent Application No. 10-2011-0082643, filed on Aug. 19, 2011, the entirety of which is incorporated by reference herein.

BACKGROUND

The inventive concept relates to solar cells and methods of manufacturing an electrolyte and, more particularly, to dye-sensitized solar cells and methods of manufacturing an electrolyte in the dye-sensitized solar cells.

Dye-sensitized solar cells may cause various problems such as leakage of an electrolyte solution, desorption of a dye caused by the electrolyte, precipitation of the electrolyte at a low temperature, and corrosion of an electrode. Thus, a new electrolyte may be urgently demanded. Unlike p-n junction solar cells, electrons excited from the dye of the dye-sensitized solar cells may be transmitted to a porous oxide thin layer and then electrons of a hole-transfer material are transmitted to the oxidized dye, such that the oxidized dye is deoxidized.

When $I^-/I^{3-}$ currently used as an oxidation-reduction reactive agent is used, efficiency of 11% may be obtained. However, the reduction of the dye may require energy of about 0.6 eV. It corresponds to energy loss in operation of the solar cell. Thus, it is required to develop a new oxidation-reduction agent capable of being replaced with $I^-/I^{3-}$.

Thus, various researches have been conducted for solidification of the electrolyte of the dye-sensitized solar cells. A p-type inorganic semiconductor, a hole-transfer material, and a gel electrolyte using a polymer have been used in the dye-sensitized solar cells. However, these may not permeates into a nano-porous $TiO_2$ electrode very well, such that efficiency may be lowered. Additionally, when a polymer electrolyte is used, diffusion length of carriers may be limited due to low conductivity of the polymer electrolyte. Moreover, when an electrolyte including nano-particles is used, even though a leakage problem may be partially resolved, it includes a solvent (e.g., 4-tert-butylpyridine, iodine) having high volatility. Thus, various problems may occur.

SUMMARY

Embodiments of the inventive concept may provide dye-sensitized solar cells including an electrolyte reducing energy loss and having excellent stability.

Embodiments of the inventive concept may also provide methods of manufacturing the electrolyte.

According to some embodiments of the inventive concepts, a dye-sensitized solar cell may include: a first electrode; a second electrode facing and spaced apart from the first electrode; and an electrolyte filling a space between the first and second electrode. Here, the electrolyte may include: a solvent including graphene dissolved in carbonate; and an oxidation-reduction agent including alkyl imidazole-based iodine and iodine.

In some embodiments, the carbonate may include propylene carbonate.

In other embodiments, the carbonate may include propylene carbonate and ethylene carbonate in a ratio of 1:1.

In still other embodiments, the alkyl imidazole-based iodine may include 1-butyl-2,3-dimethylimidazolium iodide (BDI).

In yet other embodiments, the first electrode may include: a first substrate; a first transparent-conductive thin layer disposed on one surface of the first substrate; and a metal oxide layer disposed on one surface of the first transparent-conductive thin layer. A dye may be adsorbed on the metal oxide layer.

In yet still other embodiments, the second electrode may include: a second substrate; a second transparent-conductive thin layer disposed on one surface of the second substrate; and a conductive layer disposed on one surface of the second transparent-conductive thin layer.

According to other embodiments of the inventive concepts, a method of manufacturing an electrolyte may include: deoxidizing graphene oxide to form graphene; dissolving the graphene in a carbonate solvent; and adding an oxidation-reduction agent including alkyl imidazole-based iodine into the carbonate solvent in which the graphene is dissolved.

In some embodiments, deoxidizing the graphene oxide to form the graphene may include: dissolving the graphene oxide in a solvent including a mixture of water and alkyl imidazole-based iodine; and centrifuging a solution including the graphene oxide and the solvent to obtain the graphene.

In other embodiments, the alkyl imidazole-based iodine may include 1-butyl-2,3-dimethylimidazolium iodide (BDI).

In still other embodiments, the oxidation-reduction agent may further include iodine ($I_2$).

BRIEF DESCRIPTION OF THE DRAWINGS

The inventive concept will become more apparent in view of the attached drawings and accompanying detailed description.

DETAILED DESCRIPTION OF THE EMBODIMENTS

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 1:
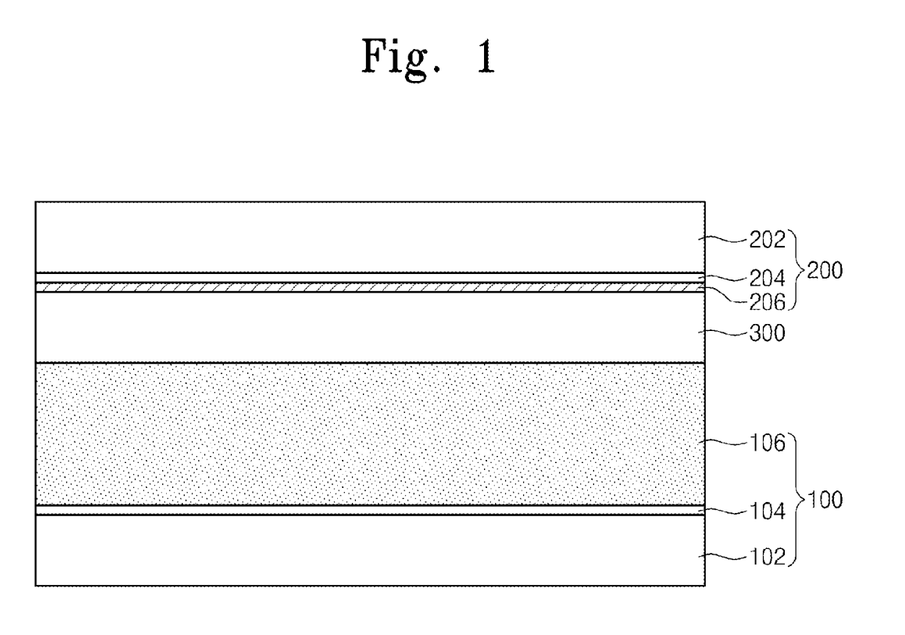
FIG. 1 is a cross-sectional view illustrating a dye-sensitized solar cell according to some embodiments of the inventive concept.

FIG. 1 is a cross-sectional view illustrating a dye-sensitized solar cell according to some embodiments of the inventive concept.

Referring to FIG. 1, a dye-sensitized solar cell may include a first electrode 100, a second electrode 200 facing and spaced apart from the first electrode 100, an electrolyte filling a space between the first and second electrodes 100 and 200.

The first electrode 100 may function as a cathode of the solar cell.

The first electrode 100 may include a first substrate 102, a first transparent-conductive thin layer 104, and a metal oxide layer 106 on which a dye is adsorbed.

The first substrate 102 may be a transparent glass substrate or a transparent flexible polymer substrate. The first transparent-conductive thin layer 104 may adhere to one surface of the first substrate 102. The first transparent-conductive thin layer 104 may be formed of an indium tin oxide (ITO) thin layer, a F-doped $SnO_2$ (FTO) thin layer, or an ITO thin layer on which antimony tin oxide (ATO) or FTO is coated.

The metal oxide layer 106 on which the dye is adsorbed may be disposed on the one surface of the first substrate 102. For example, the one surface of the first substrate 102 may face the second electrode 200. In some embodiments, the metal oxide layer 106 may include at least one of titanium oxide, tin oxide, and zinc oxide.

The dye may be adsorbed on the metal oxide layer 106. The dye may include a ruthenium complex which has ruthenium (Ru) and is able to absorb visible light. Additionally, the dye may further include at least one of xanthine-based dyes (e.g., rhodamine B, rose bengal, eosin, erythrocin), cyanin-based dyes (e.g., quinocyanin, cryptocyanin), alkaline dyes (e.g., phenosafranine, capri-blue, tyrosine, methylene blue, porphyrin-based compounds (e.g., chlorophyll, Zn porphyrin, Mg porphyrin), azo-based dyes, phthalocyanine compounds, anthraquinone-based dyes, and quinone-based dyes.

In other embodiments, the first electrode 100 may further include a blocking layer (not shown). The blocking layer may be disposed between the first transparent-conductive thin layer 104 and the metal oxide layer 106. The blocking layer may improve a contact characteristic of the metal oxide layer 106 and the first substrate 102 to which the first transparent-conductive thin layer 104 adheres. Additionally, the blocking layer may smoothly transmit electrons from the metal oxide layer 106 to the first substrate 102. Moreover, the blocking layer may control an outflow of electrons from the first substrate 102 to improve energy conversion efficiency.

The second electrode 200 may function as an anode of the solar cell.

The second electrode 200 may includes a second substrate 202, a second transparent-conductive thin layer 204, and a conductive layer 206.

The second substrate 202 may be a transparent glass substrate or a transparent flexible polymer substrate. The second transparent-conductive thin layer 204 may adhere to one surface of the second substrate 202. The second transparent-conductive thin layer 204 may be formed of an indium tin oxide (ITO) thin layer, a F-doped $SnO_2$ (FTO) thin layer, or an ITO thin layer on which antimony tin oxide (ATO) or FTO is coated.

The conductive layer 206 may be disposed on one surface of the second transparent-conductive thin layer 204. The conductive layer 206 may include platinum (Pt), carbon particles, conductive polymer, or any combination thereof.

The electrolyte 300 may fill the space between the first and second electrodes 100 and 200. The electrolyte 300 may include an oxidation-reduction agent and a solvent.

The oxidation-reduction agent may include alkyl imidazole-based iodine within a range of about 0.2M to about 0.6M and iodine within a range of about 0.01M to 0.03M. In some embodiments, the alkyl imidazole-based iodine may include 1-butyl-2,3-dimethylimidazolium iodide (BDI).

The solvent may include graphene within a range of about 60 mg to about 100 mg which is dissolved in carbonate of about 10 ml. In some embodiments, the carbonate may include propylene carbonate. In other embodiments, the carbonate may include propylene carbonate and ethylene carbonate in a ratio of 1:1.

Hereinafter, a method of operating the dye-sensitized solar cell will be described briefly.

The dye excited by sunlight may inject electrons into a conduction band of the metal oxide layer 106. The injected electrons may pass through the metal oxide layer 106 to reach at a conductive material and then the electrons may be transmitted to an external circuit. The electrons may perform an electrical work in the external circuit and then return to the electrolyte 300 through the first electrode 100. The electrons may be injected into the metal oxide layer 106 by the electron transfer function of the electrolyte 300. Thus, the dye lacking electrons may be deoxidized to complete the operation of the dye-sensitized solar cell.

Figure 2:
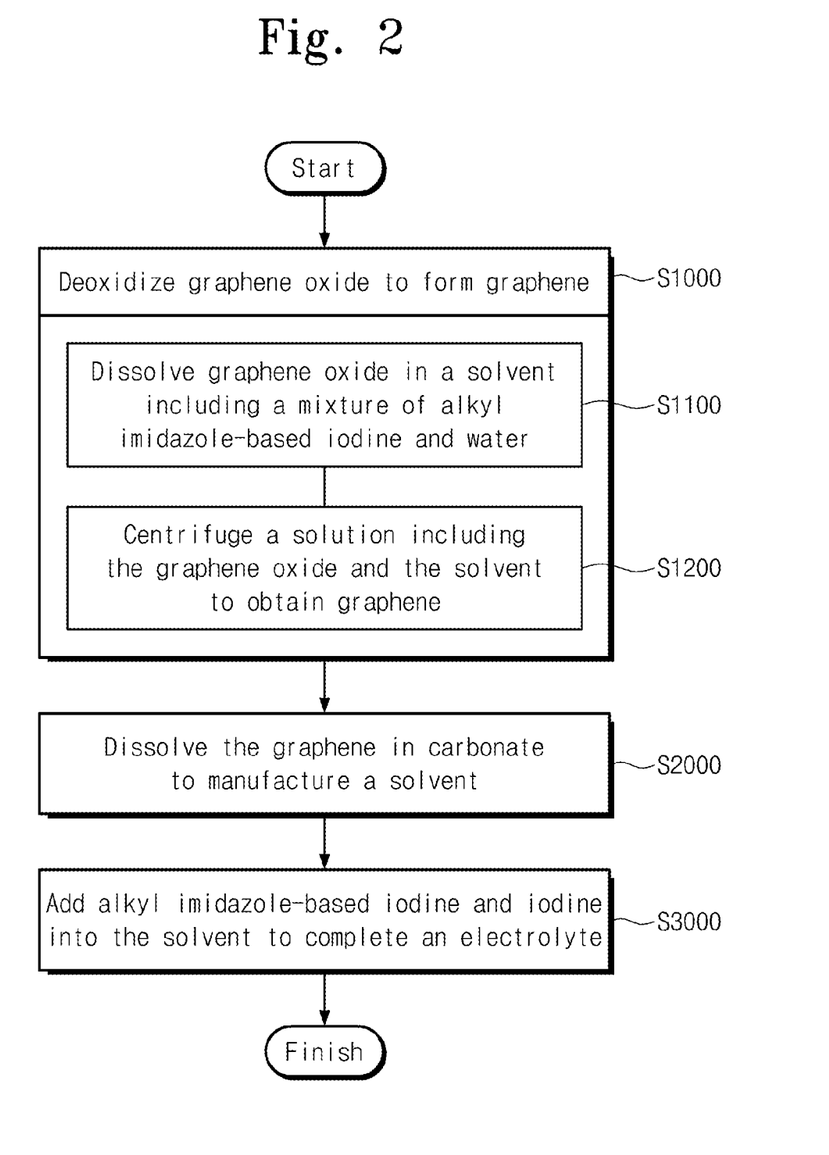
FIG. 2 is a flowchart illustrating a method of manufacturing an electrolyte of a dye-sensitized solar cell according to some embodiments of the inventive concept.

FIG. 2 is a flowchart illustrating a method of manufacturing an electrolyte of a dye-sensitized solar cell according to some embodiments of the inventive concept.

Referring to FIG. 2, graphene oxide is deoxidized to form a graphene (S1000).

The graphene oxide may be dispersed in water to be in keeping.

Deoxidizing the graphene oxide to form the graphene will be described in more detail. The graphene oxide within a range of about 50 mg to about 70 mg may be dissolved in a solvent including water within a range of about 15 ml to about 25 ml and the alkyl imidazole-based iodine within a range of about 700 μl to about 900 μl at a temperature within a range of about 80 degrees Celsius to about 90 degrees Celsius for a time within a range of about 4 hours to 5 hours (S1100). In some embodiments, the alkyl imidazole-based iodine may include 1-butyl-2,3-dimethylimidazolium iodide (BDI). A solution including the graphene oxide and the solvent may be centrifuged to obtain the graphene (S1200).

Subsequently, the graphene within a range of about 60 mg to about 100 mg may be dissolved in a carbonate solvent of about 10 ml (S2000). In some embodiments, the carbonate solvent may be a propylene carbonate solvent. In other embodiments, the carbonate solvent may be a mixture of propylene carbonate and ethylene carbonate. The mixing ratio of the mixture may be about 1:1.

The oxidation-reduction agent may be added in the carbonate solvent in which the graphene is dissolved, thereby completing an electrolyte (S3000). The oxidation-reduction agent according to some embodiments of the inventive concept may include alkyl imidazole-based iodine within a range of about 0.2M to about 0.6M and iodine within a range of about 0.01M to 0.03M. For example, the alkyl imidazole-based iodine may include 1-butyl-2,3-dimethylimidazolium iodide (BDI).

Hereinafter, a chemical reaction generated during the manufacture of the electrolyte will be described with reference a molecular structural formula.

Figure 3:
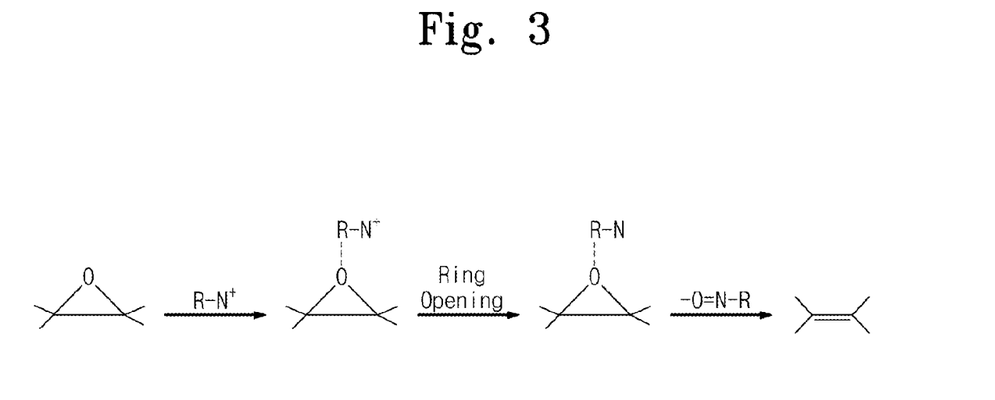
FIG. 3 is a molecular structural formula to explain a reduction reaction of graphene oxide.

FIG. 3 is a molecular structural formula to explain a reduction reaction of graphene oxide.

Referring to FIG. 3, the graphene oxide has an epoxy group. A material having nitrogen-positive ions is added in the graphene oxide. Thus, the nitrogen positive ions react with oxygen-negative ions of the epoxy group of the graphene oxide. In some embodiments, the material having the nitrogen positive ions may be 1-butyl-2,3-dimethylimidazolium iodide. Due to the above reaction, the graphene oxide loses oxygen to be deoxidized, and the material having the nitrogen positive ions obtains oxygen to be oxidized. The graphene oxide is deoxidized to form the graphene. The graphene has a double bond.

Figure 4:
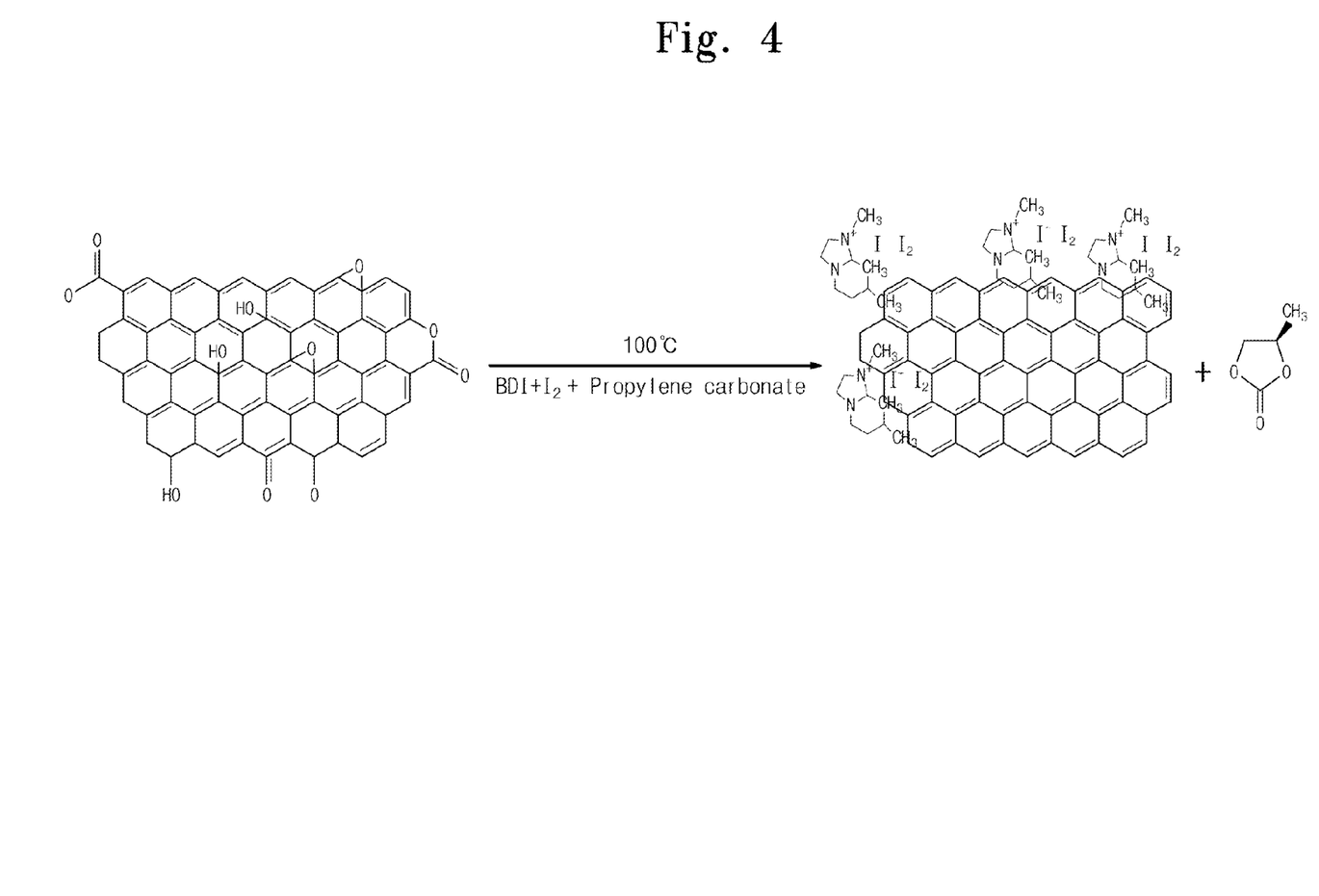
FIG. 4 is a molecular structural formula to explain a chemical reaction of an electrolyte according to embodiments of the inventive concept.

FIG. 4 is a molecular structural formula to explain a chemical reaction of an electrolyte according to embodiments of the inventive concept.

Referring to FIG. 4, 1-butyl-2,3-dimethylimidazolium iodide, propylene carbonate, and iodine molecules react with the graphene oxide at about 100 degrees Celsius. The graphene oxide may be deoxidized to form the graphene and the 1-butyl-2,3-dimethylimidazolium iodide may be oxidized during the reaction. The oxidized 1-butyl-2,3-dimethylimidazolium iodide is combined with the graphene and functions as a functional group of the graphene. Meanwhile, color variation may be observed during the reduction from the graphene oxide to the graphene. The graphene oxide has a light brown color and the graphene has a black color.

Additionally, the iodine molecules functioning as the oxidation-reduction agent may be received around the 1-butyl-2,3-dimethylimidazolium iodide used as the functional group. Thus, conductivity of the electrolyte may increase, such that electron-transfer may be improved. As a result, the efficiency of the dye-sensitized solar cell may increase.

As described above, the dye-sensitized solar cell may include the electrolyte which includes the graphene dissolved in the propylene carbonate and/or the ethylene carbonate. Thus, the dye-sensitized solar cell may resolve the problems such as leakage of the electrolyte, desorption of the dye caused by the electrolyte, and corrosion of an electrode. Additionally, since the propylene carbonate and/or the ethylene carbonate correspond to polymer solvents, it is possible to provide the electrolyte which is usable at a high temperature and has high stability.

Embodiment Example

The electrolyte of the dye-sensitized solar cell was manufactured to include graphene, propylene carbonate, alkyl imidazole-based iodine, and iodine.

1-butyl-2,3-dimethylimidazolium iodide of about 0.12 g was dissolved in propylene carbonate of about 2 ml, and graphene oxide of about 0.5 ml dispersed in water in keeping was added therein. And then the solution was refluxed at about 100 degrees Celsius for about 24 hours. The solution was centrifuged at 3000 rpm for about 20 minutes to form graphene. The graphene was dissolved in propylene carbonate of about 10 ml, and then 1-butyl-2,3-dimethylimidazolium iodide of about 0.6M and $I_2$ of 0.03M were added in the solution the propylene carbonate in which the graphene was dissolved. Thus, the electrolyte according to according to embodiments of the inventive concept was manufactured.

Comparison Example

Graphene was not added and an electrolyte including propylene carbonate, alkyl imidazole-based iodine, and iodine was manufactured by substantially the same method as described in the above embodiment example. In other words, the electrolyte of a dye-sensitized solar cell in the comparison example does not include graphene.

(Evaluation of Current-Voltage (I-V) Characteristics of Dye-Sensitized Solar Cells Including the Manufactured Electrolytes)

I-V characteristics of dye-sensitized solar cells including the electrolytes of the embodiment example and the comparison were confirmed.

Figure 5:
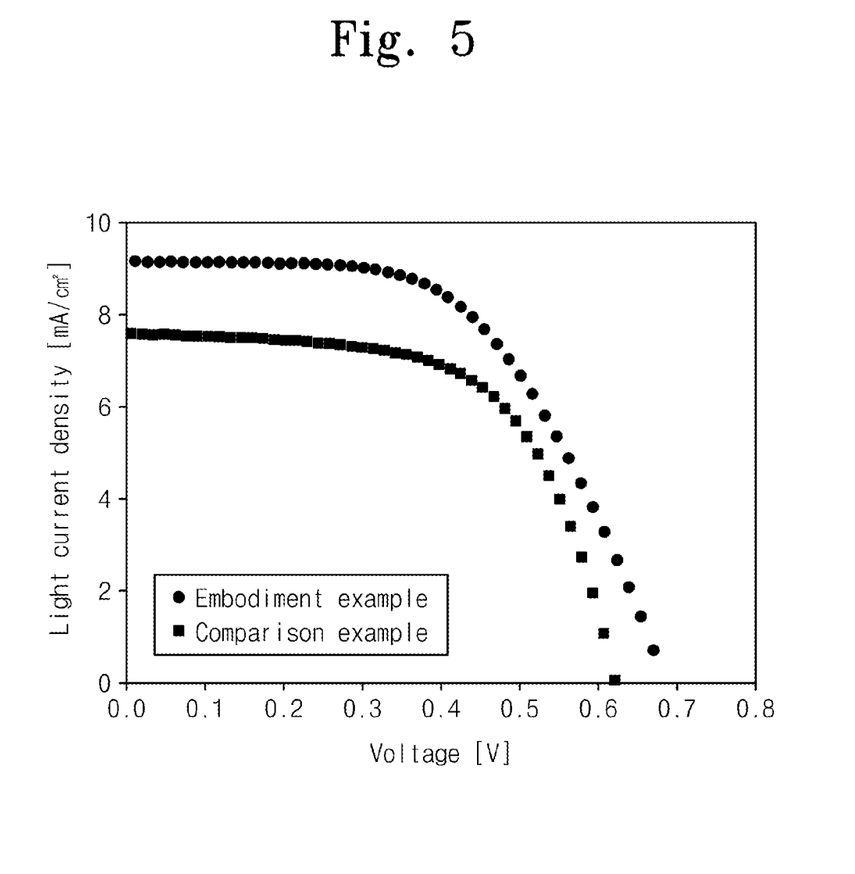
FIG. 5 is a graph illustrating current-voltage (I-V) characteristics of a dye-sensitized solar cell including an electrolyte of an embodiment example of the inventive concept and a dye-sensitized solar cell including an electrolyte of a comparison example.

FIG. 5 is a graph illustrating current-voltage (I-V) characteristics of a dye-sensitized solar cell including an electrolyte of an embodiment example of the inventive concept and a dye-sensitized solar cell including an electrolyte of a comparison example.

The electrolyte of the embodiment example includes the graphene but the electrolyte of the comparison example does not include the graphene. Referring to FIG. 5, it is confirmed that the dye-sensitized solar cell including the electrolyte of the embodiment example is more excellent in I-V characteristic than the dye-sensitized solar cell including the electrolyte of the comparison example.

(Evaluation of Quantum Efficiencies of Dye-Sensitized Solar Cells Including the Manufactured Electrolytes)

Quantum efficiencies of dye-sensitized solar cells including the electrolytes of the embodiment example and the comparison were confirmed.

Figure 6:
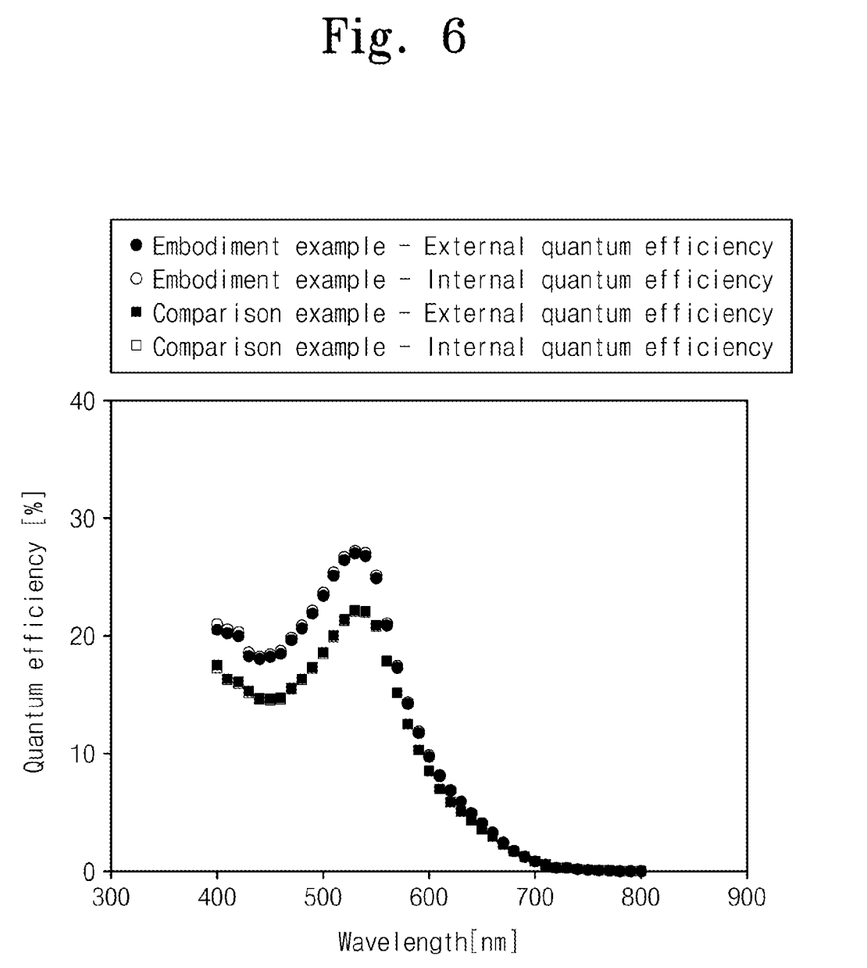
FIG. 6 is a graph illustrating quantum efficiencies of a dye-sensitized solar cell including an electrolyte of an embodiment example of the inventive concept and a dye-sensitized solar cell including an electrolyte of a comparison example.

FIG. 6 is a graph illustrating quantum efficiencies of a dye-sensitized solar cell including an electrolyte of an embodiment example of the inventive concept and a dye-sensitized solar cell including an electrolyte of a comparison example.

Referring to FIG. 6, it is confirmed that the dye-sensitized solar cell including the electrolyte of the embodiment example is more excellent in internal and external quantum efficiencies than the dye-sensitized solar cell including the electrolyte of the comparison example. Thus, in the efficiency from electron-hole combination to output of light, the electrolyte having the graphene is more excellent than the electrolyte not having the graphene.

According to embodiments of the inventive concept, the graphene oxide is deoxidized using alkyl imidazole-based iodine, such that an electrical conductivity of the electrolyte may be improved. Additionally, since the dye-sensitized solar cell includes the electrolyte which includes the graphene dissolved in the propylene carbonate and/or the ethylene carbonate. Thus, the dye-sensitized solar cell may resolve the problems such as leakage of the electrolyte, desorption of the dye caused by the electrolyte, and corrosion of an electrode. Moreover, since the propylene carbonate and/or the ethylene carbonate correspond to polymer solvents, it is possible to provide the electrolyte which is usable at a high temperature and has high stability.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of manufacturing a graphene-containing electrolyte, comprising, in the order recited:
   (a) deoxidizing graphene oxide to form graphene;
   (b) dissolving the graphene in a carbonate solvent to provide a graphene-containing solution; and
   (c) adding an oxidation-reduction agent comprised of 1-butyl-2,3-dimethylimidazolium iodide (BDI) and optionally iodine ($I_2$) into the graphene-containing solution to provide said graphene-containing electrolyte.

2. The method of manufacturing a graphene-containing electrolyte according to claim 1, wherein deoxidizing graphene oxide to form graphene is accomplished by:
   (i) dissolving the graphene oxide in an aqueous solvent that is a mixture of water and an alkyl imidazole-based iodine to form a solution; and
   (ii) centrifuging the solution to obtain the graphene.

3. The method of claim 2, wherein the alkyl imidazole-based iodine of the aqueous solvent is 1 butyl-2,3-dimethylimidazolium iodide (BDI).

4. The method of claim 1, wherein the oxidation-reduction agent includes iodine ($I_2$).

5. The method of claim 2, wherein the oxidation-reduction agent includes iodine ($I_2$).

6. A method of manufacturing a graphene-containing electrolyte, comprising, in the order recited:
   (a) deoxidizing graphene oxide to form graphene;
   (b) dissolving from about 60 to about 100 mg of the graphene in about 10 ml of a carbonate solvent; and
   (c) adding an oxidation-reduction agent consisting of from about 0.2M to about 0.6M of 1-butyl-2,3-dimethylimidazolium iodide (BDI) and optionally from about 0.01M to about 0.03M of iodine ($I_2$) into the carbonate solvent in which the graphene is dissolved to provide the graphene-containing electrolyte.

7. The method of manufacturing a graphene-containing electrolyte according to claim 6, wherein deoxidizing graphene oxide to form graphene is accomplished by:
   (i) dissolving from about 50 to about 70 mg of the graphene oxide in an aqueous solvent that is a mixture of from about 15 ml to 25 ml of water and from about 700 μl to about 900 μl of an alkyl imidazole-based iodine at a temperature ranging from about 80° C. to about 90° C. to form a solution; and
   (ii) centrifuging the solution to obtain the graphene.

8. The method of claim 7, wherein the alkyl imidazole-based iodine of the aqueous solvent is 1-butyl-2,3-dimethylimidazolium iodide (BDI).

9. The method of claim 6, wherein the oxidation-reduction agent includes iodine ($I_2$).

10. The method of claim 7, wherein the oxidation-reduction agent includes iodine ($I_2$).

* * * * *